(12) United States Patent
Swain et al.

(10) Patent No.: US 6,393,142 B1
(45) Date of Patent: May 21, 2002

(54) METHOD AND APPARATUS FOR ADAPTIVE STRIPE BASED PATCH MATCHING FOR DEPTH ESTIMATION

(75) Inventors: Cassandra Turner Swain, Aberdeen; Yao Wang, Matawan, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/064,058

(22) Filed: Apr. 22, 1998

(51) Int. Cl.$^7$ .............................. G06K 9/00; G06F 17/50
(52) U.S. Cl. .......................................... 382/154; 716/20
(58) Field of Search .................................. 382/154, 158, 382/173, 156, 157, 199, 174, 128, 108, 109, 243, 285; 716/19, 20

(56) References Cited

U.S. PATENT DOCUMENTS

| | | | | |
|---|---|---|---|---|
| 5,315,537 A | * | 5/1994 | Blacker ....................... | 364/570 |
| 5,617,334 A | * | 4/1997 | Tseng et al. | |
| 5,689,577 A | * | 11/1997 | Arata .......................... | 382/128 |
| 5,768,435 A | * | 6/1998 | Murray ........................ | 382/243 |
| 5,890,120 A | * | 3/1999 | Haskell et al. ............... | 704/277 |
| 5,960,111 A | * | 9/1999 | Chen et al. .................. | 382/173 |

OTHER PUBLICATIONS

Zeng et al. (Motion–Based Object Segmentation and Estimation Using the MDL Principle, IEEE Transactions on Image Processing, vol. 4, No. 9, Sep. 1995, pp. 1223–1235.*

Park et al. (Adaptive Mesh Refinement for Boundary Element Method and Its Application to Stripline Analysis, IEEE Transactions on Magnetics, vol. 26, No. 2, Mar. 1990, pp. 783–786).*

Wang, Y., et al., "Active Mesh –A Feature Seeking and Tracking Image Sequence Representation Scheme", IEEE, vol. 3, No. 5, pp. 610–624 (1994).

Tamtaoui, A., et al., "Constrained Disparity and Motion Estimators for 3DTV Image Sequence Coding", Image Communication, vol. 4, No. 1, pp. 45–54 (1991).

Prager, J. A., "Extracting and Labeling Boundary Segments in Natural Scenes", IEEE, vol. PAMI–2, No. 1, pp. 16–27 (1998).

* cited by examiner

*Primary Examiner*—Leo Boudreau
*Assistant Examiner*—Duy M. Dang
(74) *Attorney, Agent, or Firm*—Kenyon & Kenyon

(57) ABSTRACT

A method and apparatus provide a technique for generating a mesh based on an image view. The mesh includes a plurality of trapezoidal patches which can be used in a comparison operation with regard to a second co-planar image view. The comparison operation extracts disparity information between the patches of the respective images and these disparities can be used to calculate depth estimations for objects within the image of use.

20 Claims, 3 Drawing Sheets

METHOD AND APPARATUS FOR ADAPTIVE STRIPE BASED PATCH MATCHING FOR DEPTH ESTIMATION

BACKGROUND OF THE INVENTION

The present invention is directed to a method and apparatus for providing depth estimation. More particularly, the present invention provides an adaptive stripe-based patch matching process for performing depth estimation.

It is known that it is possible to use multiple views of a given image field to provide depth information regarding the object or objects within the field. This technique is particularly useful in the art of robotics where it is necessary to estimate the depth of one or more objects in connection with controlling the operation of a robot. One technique for providing depth estimation is to use two cameras side-by-side that provide co-planar imaging planes, that is the imaging planes of the cameras are co-planar. The depth of objects within the field of view of the two cameras is determined by comparing the contents of the images provided by each camera and detecting, for example, displacements of the objects in one view relative to the other. It is also known that the imaging planes need not be co-planar so long as the image data is processed so as to create the effect that the imaging planes are co-planar.

FIGS. 1 and 2 provide examples of a two-image depth estimation system arrangement. In such a system two images, a left image 120 and a right image 110 can be captured with cameras to provide co-planar images. The left image, provided as input 220, and the right image, provided as input 210, are supplied to a processor 230 which operates in conjunction with the depth estimation module 240 to calculate the depth based on the information in the images provided by in the cameras.

In these systems, locating the same point in multi-viewed images is one of the most difficult aspects of developing computational algorithms for stereopsis. The majority of the stereo matching approaches can be classified as either block-based or feature-based methods. In block-based methods, matching is done based on an intensity pattern similarity of a block around a given point in a field of view. The aim is to obtain correspondences for every image point. By contrast, the feature-based methods assign disparity, which is a lateral difference between a matched point, but only to feature points such as corner points, edges or zero crossings. Most stereo algorithms, however, tend to produce error due to noise, low feature content, depth discontinuities, occlusion, and photometric differences for example.

It is well known that for certain types of matching primitives, finding correspondence is an ill-posed problem. To regularize this problem a smoothness constraint on the disparity field is generally incorporated, although smoothing over disparity boundaries is physically incorrect. Previous research on block-based techniques showed that the matching window size must be large enough to include sufficient intensity variation for matching, but the size must be small enough to avoid the effect of projective distortion. If the window is too small, or doesn't cover enough intensity variation, the estimation is poor because of low intensity to noise ratio. Conversely, if the window is too large, the estimated depth may not represent correct matching because of over averaging of the spacial information.

It would be beneficial if a technique could be provided which would improve the analysis of co-planar images for the purposes of performing depth estimation calculations.

SUMMARY OF THE INVENTION

The present invention provides a method and an apparatus for facilitating the analysis of multiple images where comparison of the images can be used to provide depth estimation of objects within the images. In particular, in accordance with an embodiment of the present invention, one of the images is divided into a mesh using an adaptive stripe based patch determination technique. In particular, in accordance with an embodiment of the present invention a mesh representative of an image is generated by dividing the image into a plurality of horizontal stripe regions and then, within each horizontal stripe region, selecting at least one line segment extending from a top boundary of the region to a bottom boundary of the region from a plurality of line segments wherein the selection is made with reference to a relative power of the plurality of line segments. In accordance with the present invention a mesh or patch pattern of an image is created whereby the image is divided into a plurality of trapezoidal patch regions.

In accordance with yet another embodiment of the present invention, once a mesh representation of a first image is created then a second image, can be analyzed to find regions in the second image that correspond to trapezoidal regions in the mesh generated concerning the first image. Then a disparity between corresponding regions of the two images is detected. This disparity information can then be utilized in connection with determining a depth of an object appearing in the two images.

The two images of interest can be co-planar, but need not be. It is advantageous if the normal lines of the imaging planes of the two images are parallel.

Other advantages will be clear from a description of the details of the invention which follow.

DETAILED DESCRIPTION

In accordance with the present invention a novel depth estimation technique is provided. In one embodiment, the technique involves generating a mesh; modeling depth functions for mesh components; and extracting of disparity and depth by error minimization in a hierarchical manner although the modeling and extracting steps may be varied.

One of the advances provided by the present invention arises from the use of a special mesh structure. Rather than using an arbitrarily structured mesh, the present invention employs a striped mesh in which an image is divided into horizontal stripes and each stripe is further divided into quadrilaterals. This mesh belongs to the general category of the quadrilateral mesh, but each quadrilateral element is constrained to have parallel sides on the top and bottom, that is each mesh patch is trapezoidal.

The motivation of using stripes comes from the nature of the correspondence problem, that is the problem of determining correspondence between elements in respective images that are to be compared. For a non-vergent camera system geometry, disparity vectors lie parallel to epipolar lines. This epipolar constraint allows for a controlled correspondence search strategy. Thus, a stereo matching scheme which specializes in epipolar-directional searching is more effective in terms of speed and accuracy. The epipolar line constraint and the uniqueness constraint, that is the constraint which asserts that a given point in the image may be assigned at most one disparity value, can be applied simultaneously to a mesh that consists of stripes along the epipolar lines. By using a striped mesh rather than an arbitrary mesh, it is possible to keep a set of all potential correspondences for a patch in a simple form, therefore processing on this set, namely on the stripe, becomes more efficient. Unlike an arbitrary mesh, reallocation of nodes only affects two adjoint patches on the stripe. Besides, a matching error function calculated for a stripe element that is a trapezoid is faster in computation time than the one calculated for an arbitrary triangle or quadrangle. The left and right borders of patches are chosen such that the borders correspond to distinctive depth changes and the patch approximates a flat surface in a three dimensional scene. This provides disparity field segmentation which is necessary to avoid smoothing the disparity field over object boundaries. The shape of the patches is determined depending on the local intensity changes due to depth variations in the scene. Thus, the method of generating trapezoidal patches overcomes the deficiencies of the block-based matching methods which use constant-sized and shaped matching windows.

Figure 1:
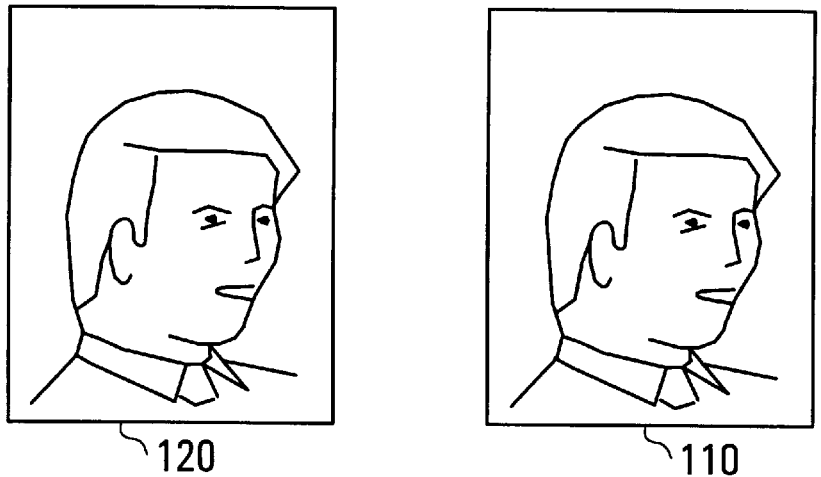
FIG. 1 illustrates an example of right and left images which can be utilized in connection with the present invention.
Figure 2:
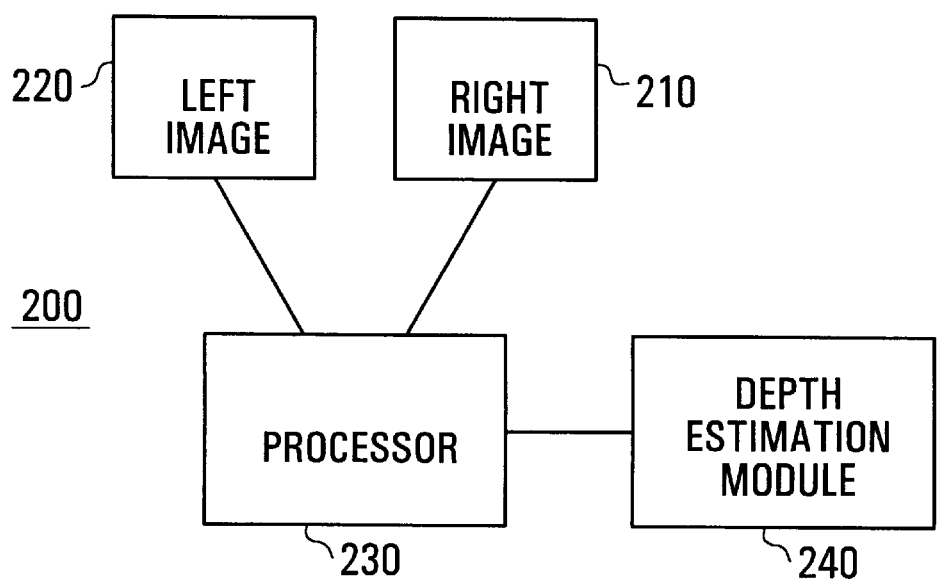
FIG. 2 illustrates a depth calculation system in which the present invention can be implemented.
Figure 3:
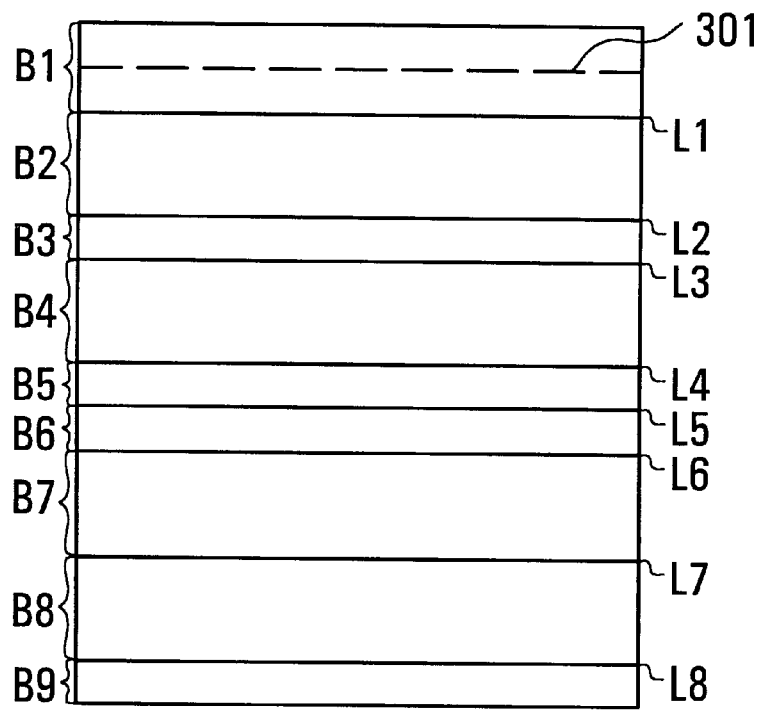
FIG. 3 provides an example of dividing an image into a plurality of stripes in accordance with the present invention.
Figure 4:
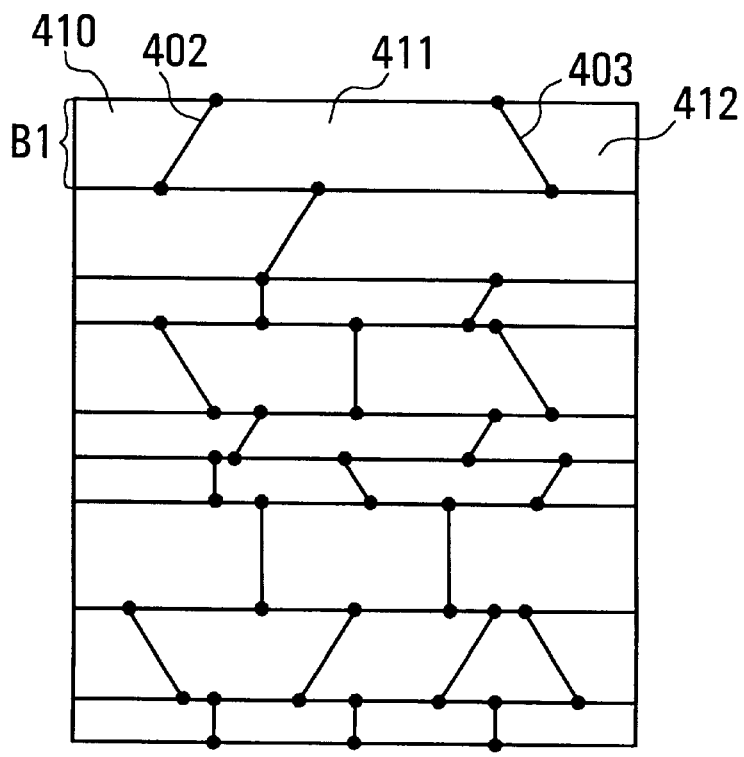
FIG. 4 illustrates an example of dividing the plurality of stripes of FIG. 3 into a plurality of trapezoidal patches in a method in accordance with an embodiment of the present invention.
Figure 5:
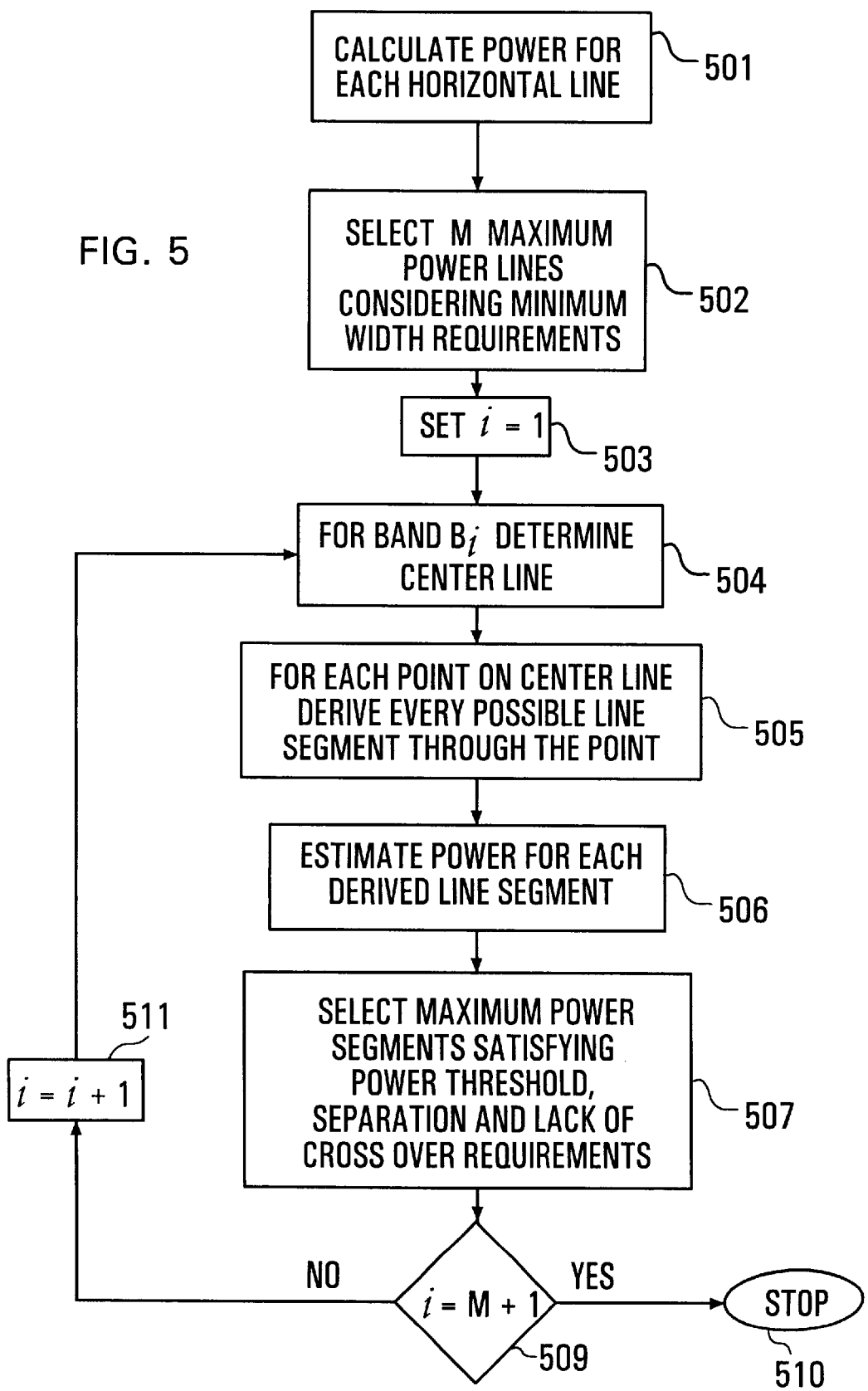
FIG. 5 provides a flow diagram describing a process for generating a mesh such as that shown in FIG. 4 in accordance with an embodiment of the present invention.

An example of a process for setting forth a mesh in accordance with the present invention is described in relationship to the flow diagram of FIG. 5. This flow diagram describes a process that can be implemented by a depth estimation module such as the module 240 in FIG. 2. In connection with this method left and right co-planar images such as 120 and 110 of FIG. 1 can be analyzed. Reference will also be made to FIGS. 3 and 4 during the course of describing the process flow where these latter two figures provide examples of process points with regard to the generation of a mesh structure regarding one of the images.

As a preliminary matter, while it is assumed in this embodiment that two coplanar images are presented to the processing system, implementation of the present invention is not limited to simply two images nor is the invention limited to co-planar images as it is well-known how to transform non-co-planar images into data effectively representative of co-planar images. The remainder of this description, will focus on the two cases where the data effectively represents co-planar images regardless of whether the imaging planes are in fact co-planar. In that case, one of the images is selected for purposes of generating a mesh. In an initial step the mesh generation technique calculates a power for each horizontal line of the image, step 501. The process then selects M, where M constitutes an integer number, of the horizontal lines based on the calculated power and the minimum width requirements for defining the stripes or bands of the image. In one possible algorithm for selecting the horizontal lines the process first measures the power of each horizontal line and calculates an average line power. This value is then multiplied by a pre-determined weighting factor to set a minimum power value; the horizontal power lines having the greatest power. The process then eliminates those lines that do not exceed the minimum power value, each stripe or band formed by the remaining horizontal lines to determine if the band or stripe width satisfies the minimum width requirements. If any of the bands does not satisfy the minimum width requirements then one of the power lines forming the band is eliminated so as to expand the band or stripe. An example of determining lines for a mesh structure is shown in FIG. 3. Here lines L1 to L8 correspond to 8 power lines that satisfy the minimum power and minimum band width requirements and which in turn define bands B1 to B9. In this circumstance then each band, B1 to B9, is greater than or equal to the minimum width required for generating the desired mesh. An index tracker "i" is initialized, step 503 and then the patches in each band are determined in the remaining steps of the process. For band Bi the process determines a center line of the band, step 504. For example, for band B1 the process determines the midpoint or center line of the band, the line being shown as dashed line 301. Then, for each point on the center line the process derives every possible line segment through the point that also intersects with the top and bottom boundaries of the band, step 505. Thus, for example, for band B1 the process would examine each line segment passing through a point of center line 301 and intersecting lines $L_0$ (the top boundary of the image) and $L_1$ (the first of the M selected horizontal lines). For each such possible line segment the process estimates the power, step 506. The process then selects the maximum power segments among the plurality of possible line segments that pass through the points of the center line such that the segments satisfy a minimum power threshold and so that they satisfy a minimum separation between line segments and satisfy a requirement that there be a lack of a cross over between patches. An example of these possible line segments for band B1 are shown as line segments 402 and 403 in FIG. 3. The result is the creation of three horizontal patch sections 410, 411 and 412 in band B1. After the line segments are determined for a particular band, the index "i" is compared to the value of M+1. If the index equals this value then the operation stops, that is in the example shown in FIGS. 3 and 4 once band B9 (where M=8) has been parsed into patches then the mesh has been completely generated. If the index does not equal M+1 then the index "i" is incremented and the segmentation of the next band is begun at step 504.

Once the mesh is generated, the second image, i.e., the view provided by the second camera (for example) can now be compared to the generated mesh. In particular, a patch in the first image is selected and then the depth estimation system looks in the second image for a match to that patch. The stripes help locate the patch. The depth estimation calculation then determines a disparity between the patch in the first image and that in the second image and uses that disparity to calculate the depth.

Having given a general description of an embodiment of the present invention, further details regarding calculations of the mesh and the depth estimation will now be provided.

Mesh Generation

In accordance with a determination of the mesh let the base line of the image be parallel to the x axis and the camera imaging planes be coplanar. Let the stereo intensity images after some preprocessing be $f_L(x)$ and $f_R(x)$ where x is a two-dimensional position vector. Then $f_L$ and $f_R$ are related by equation one in which $$f_R(x)=f_L(x-d(x))+n(x) \qquad (1)$$

where d (x) is the disparity vector function and n (x) represents the intensity change due to photometric effects as well as noise. In the present study, for simplicity purposes, this latter term is ignored. A horizontal edge H (x) and omnidirectional edge maps E (x), which will be used for mesh generation are obtained by applying a 3×3 sobel filter to one of the images, (presume for discussion that it is the left image) followed by a confining confidence algorithm such as described in the paper "Extracting and labeling boundary segments in natural scenes" by Prager, IEEE Trans. Pami 2 pages 16 to 27, January 1980.

The mesh M ($s$, $r_i$), where s stands for stripe number, r stands for patch number, and i is one of the four corners, is derived from H (x) and E (x). Firstly the stripes are determined. An edge strength for each row is calculated by adding the horizontal edge magnitudes H (x) along a band around each row. All rows are ordered with respect to their edge strengths and the row with maximum strength value is selected if there is no previously selected row close to it. The minimum inter-row distance constraint and an edge strength threshold are included to limit the number of stripes as well as to avoid overly fine divisions.

After the stripes are obtained the next step in the algorithm segments each of these stripes into quadrilateral regions. Based on the edge map, E (x), the left and right borders of each quadrilateral are determined. This is accomplished by ordering all possible borders according to an edge score, then selecting the first n of them. The edge score for a border line is defined as the summation of the edge magnitudes in pixels along the neighborhood of the borderline. To avoid two borders to become too close the selection is done sequentially, so that a newly selected border line is sufficiently far away from the previously chosen borders. This will yield the values of M ($s$, $r_i$) for i=1..4, the coordinates of $r^{th}$ patch in the $s^{th}$ stripe.

Depth Estimation

Having defined the mesh for one of the images it is now possible to do depth and disparity modeling. Let Z ($s$, $r_i$) denote the depth at the patch corners. There are two options for estimating these depth values. In the first option, the depth of image scene changes continuously inside each patch as well as across patch borders. With a second option the depth is assumed to be continuous inside each patch but jumps are allowed between the neighboring patches. When the depth continuity constraints for a mesh is employed, the value of Z ($s$, $r_i$) is equal to Z ($s$, $r+1_j$) for the pairs (i,j)=(2, 1), (3,4) as shown in FIG. 4.

If the corresponding mesh in the right image is M̂ ($s$, $r_i$) then we relate M and M̂ by equation 2.

$$\hat{M}(s, r_i) = M(s, r_i) + d(s, r_i) \quad (2)$$

Note that because epipoles are in the horizontal direction, the disparity in the vertical direction is zero which reduces the disparity vector to a real number. If the vector p is the coordinates of a point inside the $r^{th}$ patch of the $s^{th}$ stripe, the disparity of this point is found by equation 3 in which $$d(p) = g(p, M(s, r_i), Z(s, r_i), i=1..4) \quad (3)$$

This means that disparity at this point is a function of the coordinates and depth of the corresponding patch corners. The function g depends on the depth model and should have a degree of freedom up to 4.

Let $\Psi_{s,r}$ (X, Y) be the depth model function that models the depth changes in the world coordinates corresponding to the $r^{th}$ patch of the $s^{th}$ stripe. If the world patch is assumed to have a constant depth value, that is $$\Psi_{s,r}(x, y) = c \quad (4)$$

where c is a constant non-negative number then g is also a constant independent of the position p. If the depth of the world patch is modeled as a plane $$\Psi_{s,r}(x, y) = ax + by + c \quad (5)$$

then the function g is an affine function of p and its parameters are the functions of M ($s$, $r_i$), Z ($s$, $r_i$) (which in turn depends on d ($s$, $r_i$)), focal length and base line distinct. These parameters can be derived by a least square fitting. If a non-linearly changing depth surface is assumed then g can be approximated by a rational function up to a certain order.

To determine the depth values Z ($s$, $r_i$), first d ($s$, $r_i$) is determined which essentially requires matching each node M ($s$, $r_i$) in, for instance, the left image with a corresponding node M̂($s$, $r_i$) on the right image. After generating the mesh, preprocessing the input stereo pair to compensate possible luminesce differences and cropping out the sides (left side of the left and right side of the right image for zero camera system convergence angle) which are not visible in both of the images, matching is then done by minimizing a matching error between corresponding trapezoid elements in the stereo pair for each stripe.

At the beginning, there is no initial depth map for the first stripe to start the iterative algorithm. The depth values for the first stripe at this level is initialized with an average depth. The first order gradient descent method is employed to minimize the matching error. The matching error function for the $s^{th}$ stripe is defined as $$E_s = \frac{1}{2} \sum_{j=1}^{P_s} \sum_{x \in R^j} [f_L(x) - f_R(x - g(x, M(s, r_i), Z(s, r_i)))]^2 \quad (6)$$

where $P_s$ is the number of patches in the stripe and $R^j$ is the set which includes all pixels in the $j^{th}$ patch. The updated versions of two nodes along each border line are evaluated from the matching error over the two adjoint patches. In these two patches, disparity values of the image patch points are derived from Z ($s$, $r_i$). The depth values for the world patch are obtained from $\Psi$ and transferred into image plane disparity domain by the function g.

Once the depth values of one stripe are obtained, they are used to initialize the depth values in the next stripe by using a vertical continuity criterion. This criterion is acquired from the horizontal edge map and assumes that the depths of two points on the same vertical line are similar if there is no horizontal edge between them. Successive stripes are processed in the same way. To speed up the computation time as well as providing a global continuity constraint which is suitable to most of the cases, a multi-resolution approach is employed. The previously described algorithm is first applied to the coarsest resolution and the resultant depth map is then propagated to a finer resolution. Lastly, a post processing filter is applied in order to smooth the resultant depth map.

In conclusion, the present invention provides both a new way of generating a mesh with respect to an image for purposes of image processing and a new technique for depth estimation utilizing the generated mesh. The mesh, in one example, is generated from edge maps and is used to find patch correspondences between two images.

It should be noted that the invention is not restricted to forming a mesh starting with horizontal lines. The invention can still be achieved using images arranged vertically with respect to one another and the initial power lines and bands would then be vertical. Furthermore, the operations performed on those bands to create the remaining mesh lines would correspond to that performed on the horizontal bands of the first embodiment only translated to account for vertical bands. It should also be expected that if the images are not strictly vertical or horizontal the band forming step and mesh generating steps could be modified accordingly and still achieve the results of the present invention.

One particular embodiment has been set forth with regard to a way of calculating the edges of the patches in the generated mesh. Variations on these techniques are available so long as the mesh generation technique adapts to the real depth changes of the scene and takes advantage of the epipolar nature of the two images.

What is claimed is:

1. A method for generating a mesh representative of an image, the method comprising the steps of:
   dividing the image into a plurality of horizontal stripe regions, said step of dividing including:
      calculating a power value for each of the plurality of horizontal lines of the image;
      selecting M (where M is an integer $\geq 1$) lines of the plurality of horizontal lines employing selection criteria that includes reference to the respective power values of the lines; and
   for each horizontal stripe region,
      selecting at least one line segment extending from a top boundary of the region to a bottom boundary of the region from a plurality of line segments,
      wherein said selection is made with reference to a relative power of the plurality of line segments.

2. The method of claim 1 wherein said selection criteria further include a predetermined minimum width of a horizontal stripe region.

3. The method of claim 1 further comprising the step of determining a reference line for each horizontal stripe region and wherein said step of calculating is performed with respect to said reference line.

4. The method of claim 3 wherein said reference line comprises a center line of the region.

5. The method of claim 3 further comprising the steps of,
   for each of a plurality of points along said reference line, deriving a plurality of possible line segments through the point;
   for each line segment estimating a power value; and
   making said selection of at least one line segment with reference to said power values.

6. The method of claim 5 wherein said selection if at least one line segment is made also with reference to segment separation criteria.

7. In a process for performing depth estimation, a method for generating a patch pattern in relation to an image to be analyzed, the method comprising the steps of:
   determining horizontal edges for a plurality of horizontal stripes corresponding to the image, said step of determining including:
      determining a power value for each horizontal row of pixels, and
      selecting a row of pixels as a horizontal edge based on a power value of the row and a distance from an adjacent horizontal edge; and
   selecting one or more line segments between the horizontal edges of a particular region so as to divide said particular region into a plurality of trapezoidal patches.

8. The method of claim 7 wherein said step of selecting one or more line segments in a particular region comprises the sub-steps of:
   determining a reference line in said particular region;
   for each of a plurality of points along said reference line, deriving a plurality of possible line segments through the point;
   for each line segment estimating a power value; and
   making a selection of a line segment, with reference to said power values.

9. The method of claim 8 wherein said selection is made also with reference to segment separation criteria.

10. In a process for performing depth estimation, a method for generating a patch pattern in relation to an image to be analyzed, the method comprising the steps of:
    determining horizontal edges for a plurality of horizontal stripes corresponding to the image; and
    selecting one or more line segments between the horizontal edges of a particular region so as to divide said particular region into a plurality of trapezoidal patches, wherein said step of selecting includes:
       determining a reference line in said particular region;
       for each of a plurality of points along said reference line, deriving a plurality of possible line segments through the point;
       for each line segment estimating a power value; and
       making a selection of a line segment with reference to said power values.

11. The method of claim 10 wherein said selection is made also with reference to segment separation criteria.

12. A method for performing depth estimation of an object in an image field, the method comprising the steps of:
    generating a first image of the object from a first perspective;
    dividing the first image into mesh representation, the step of dividing including the sub-steps of:
       dividing the image into a plurality of horizontal stripe regions, and
       for each stripe region selecting at least one line segment extending between horizontal edges of the stripe region in accordance with a power value associated with said at least one line segment;
    generating a second image of the object from a second perspective;
    comparing said second image and said first image to determine portions of aid second image corresponding to patches of said mesh representation of said first mage;
    determining a disparity of corresponding portions of the second images and he patches of the mesh representation that relate to the object;
    estimating depth based on determined disparity and information relating to said first perspective and said second perspective.

13. The method of claim 12 wherein said first image and said second image are processed as if they are co-planar images.

14. The method of claim 12 wherein said step of dividing the image comprises the sub-steps of:
    calculating a power value for each of a plurality of horizontal lines of the image;
    selecting M (where M is an integer $\geq 1$) lines of said plurality of horizontal lines employing selection criteria that includes reference to the respective power values of the lines.

15. The method of claim 12 wherein said step of selecting at least one line segment in a stripe region comprises the sub-steps of:
    determining a reference line in said particular region;
    for each of a plurality of points along said reference line, deriving a plurality of possible line segments through the point;

for each line segment estimating a power value; and making a selection of a line segment with reference to said power values.

16. The method of claim 15 wherein said step of dividing the image comprises the sub-steps of:

calculating a power value for each of a plurality of horizontal lines of the image;

selecting M (where M is an integer $\geq 1$) lines of said plurality of horizontal lines employing selection criteria that includes reference to the respective power values of the lines.

17. A method for comparing co-planar images of a field of view to estimate depth of at least one object in the field of view, the method comprising the steps of:

generating a mesh representation of a first one of the co-planar images, said mesh constituting a plurality of trapezoidal regions having parallel horizontal edges and having boundaries defined in relation to relative powers of regions of the first image;

analyzing a second one of said co-planar images with reference to the generated mesh to find regions in said second one of said co-planar images corresponding to trapezoidal regions in said mesh; and detecting a disparity between a trapezoidal region and a corresponding region in the second one of said co-planar images.

18. The method of claim 17 comprising the further step of determining a depth of an object using detected disparity related to the regions of the first and second co-planar images in which the object appears.

19. A method for detecting a position of an object with respect to a reference position, the method comprising the steps of:

detecting a pair of co-planar images of an image field including the object;

dividing a first one of the pair of co-planar images into a mesh representation constituting a plurality of trapezoidal regions having parallel horizontal edges and having boundaries defined in relation to relative powers of regions of the first image; and comparing a second one of said pair of co-planar images to aid mesh representation, said step of comparing comprising the sub-steps of, detecting a region in said second image that includes the object and which corresponds to a trapezoidal region in the mesh that includes the object;

detecting a disparity between the detected region and its corresponding trapezoidal region; and determining a depth of the object having the detected disparity.

20. A method for obtaining depth estimation of an object in a first image and a second image, the method comprising the steps of:

dividing the first image into a plurality of horizontal stripe regions;

for each horizontal stripe region, selecting at least one line segment extending from a top boundary of the region to a bottom boundary of the region from a plurality of line segments, wherein said selection is made with reference to a relative power of the plurality of line segments; and obtaining depth estimation for the object based on the horizontal stripe regions and the at least one line segment.

* * * * *